United States Patent
Neuhaus

(10) Patent No.: US 8,851,449 B2
(45) Date of Patent: Oct. 7, 2014

(54) MAGNETIC VALVE

(75) Inventor: Dietmar Neuhaus, Düsseldorf (DE)

(73) Assignee: Deutsches Zentrum für Luft—und Raumfahrt E.V., Köln (DE)

( * ) Notice: Subject to any disclaimer, the term of this patent is extended or adjusted under 35 U.S.C. 154(b) by 452 days.

(21) Appl. No.: 13/145,351

(22) PCT Filed: Jan. 15, 2010

(86) PCT No.: PCT/EP2010/050471
§ 371 (c)(1), (2), (4) Date: Jul. 20, 2011

(87) PCT Pub. No.: WO2010/086241
PCT Pub. Date: Aug. 5, 2010

(65) Prior Publication Data
US 2011/0284778 A1 Nov. 24, 2011

(30) Foreign Application Priority Data
Jan. 31, 2009 (DE) .......................... 10 2009 006 987

(51) Int. Cl.
*F16K 31/02* (2006.01)
*F16K 31/06* (2006.01)

(52) U.S. Cl.
CPC ......... *F16K 31/0675* (2013.01); *F16K 31/0665* (2013.01); *F16K 31/0651* (2013.01)
USPC .................. 251/129.14; 251/129.21; 335/280

(58) Field of Classification Search
USPC .............. 251/64–72, 129.14, 129.15, 129.19, 251/129.2, 129.21; 137/38, 39, 909; 335/280
See application file for complete search history.

(56) References Cited

U.S. PATENT DOCUMENTS

| | | | |
|---|---|---|---|
| 3,147,188 A * | 9/1964 | Campbell | 335/280 |
| 3,556,156 A * | 1/1971 | Fuller, Jr. | 251/129.14 |
| 3,863,182 A * | 1/1975 | Lapointe | 335/280 |
| 4,640,303 A * | 2/1987 | Greenberg | 251/65 |
| 4,960,146 A * | 10/1990 | Morris | 137/39 |
| 5,284,302 A * | 2/1994 | Kato et al. | 251/129.15 |
| 5,427,352 A * | 6/1995 | Brehm | 251/64 |

(Continued)

FOREIGN PATENT DOCUMENTS

DE 3418654 A1 11/1985
DE 19922414 C1 11/2000

(Continued)

OTHER PUBLICATIONS

International Search Report dated Jul. 5, 2011 in corresponding International Patent Application No. PCT/EP2010/050471, 6 pages.

*Primary Examiner* — Eric Keasel
(74) *Attorney, Agent, or Firm* — Maier & Maier, PLLC

(57) ABSTRACT

The invention relates to a valve having a closure element which is movable in an inner chamber and closes or clears a valve seat. The closure element is activated by a magnetic assembly in the magnetizable wall surrounding the inner chamber. According to the invention, the closure element has a low density. It comprises a hollow body having at least one activator body made of magnetizable material that is freely movable therein. The closure element has a low weight and a large surface. The large surface facilitates the resetting of the closure element on the valve seat by the action of the flowing medium.

20 Claims, 2 Drawing Sheets

(56) References Cited

U.S. PATENT DOCUMENTS

Figure 1:
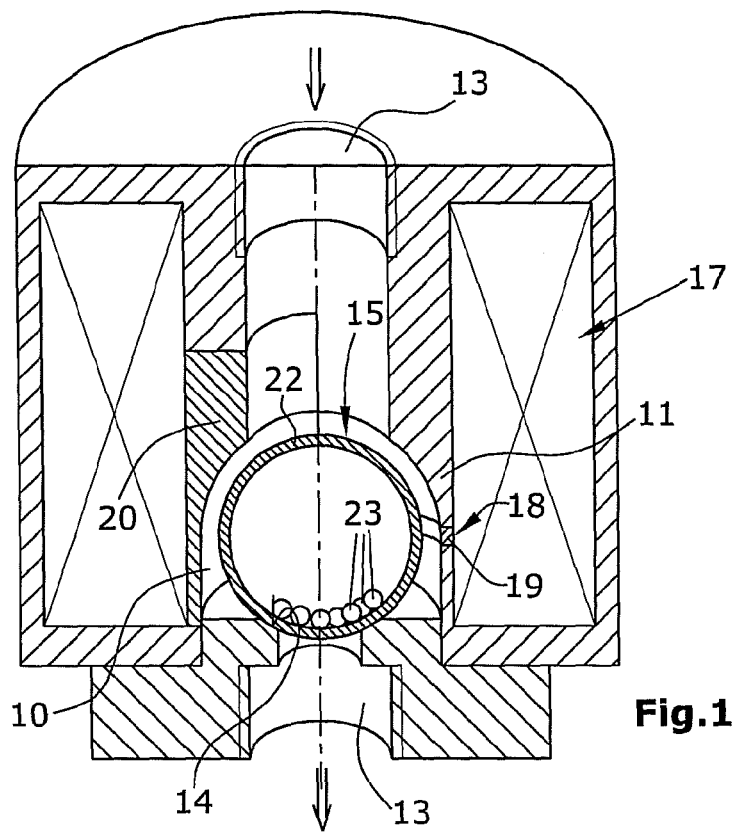

| | | | |
|---|---|---|---|
| 5,711,347 A * | 1/1998 | Sturman et al. | 251/129.14 |
| 7,350,539 B2 * | 4/2008 | Kaneko | 251/64 |
| 2002/0074532 A1 | 6/2002 | Rovira et al. | |
| 2006/0151733 A1 | 7/2006 | Tyler | |
| 2008/0224077 A1 * | 9/2008 | Neuhaus | 251/129.14 |
| 2008/0290304 A1 | 11/2008 | Neuhaus | |

FOREIGN PATENT DOCUMENTS

| | | |
|---|---|---|
| DE | 10359852 B3 | 6/2005 |
| DE | 102005035878 B3 | 8/2006 |
| DE | 102005050276 A1 | 4/2007 |
| EP | 1217273 A2 | 6/2002 |
| WO | 2007045535 A1 | 4/2007 |

* cited by examiner

MAGNETIC VALVE

RELATED APPLICATIONS

This application is the U.S. national stage application which claims priority under 35U.S.C. §371 to International Patent Application No.: PCT/EP2010/050471, filed on Jan. 15, 2010, which claims priority under 35 U.S.C. §119, to German Patent Application No.: 10 2009 006 987.9, filed on Jan. 31, 2009, the disclosures of which are incorporated by reference herein their entireties.

The present invention relates to a magnetically operable valve according to the precharacterizing part of claim 1.

A valve of the above type is described in DE 199 22 414 C1 (DLR). Said valve comprises an inner chamber, surrounded by a magnetizable wall, with a spherical closure element movably arranged therein. At the outlet of the inner chamber, a valve opening is provided which can be closed by the closure element. In the interior of the wall of the inner chamber, a magnetic flux is generated which is interrupted by a discontinuity site. At this site, the magnetic flux issues out from the wall so that the closure element can be seized by the magnetic flux. By excitation of the magnet, the closure element is moved from the valve seat toward the wall of the inner chamber. Thereby, the valve will be opened. Magnetically operable valves of similar types are described in DE 10 2005 035 878 B3 (DLR) and DE 103 59 852 B3 (DLR). In these valves, the closure element is held on the valve seat only by the effect of the pressure difference between the inlet and the outlet of the valve. The closure element is magnetizable and will be moved away from the valve seat by the generated magnetic field. For closing the valve, use is made of the medium flowing through the valve, whose flow forces will carry the closure element back onto the valve seat.

A closure element for a magnetically operable valve has to be magnetizable. Preferably, this is effected by use of ferromagnetic metals, such as iron, cobalt or nickel. Further, the closure element should suitably have a low density so as to achieve a high acceleration. The inert mass of a closure element tends to impede the closure process. For this reason, the mass of a closure element should be kept as small as possible. On the other hand, the closure process is accomplished by the flow and pressure forces acting on the surface of the closure element. Under this aspect, the surface of the closure element should be large.

It is an object of the invention to provide a magnetically operable valve which comprises a magnetizable closure element with large dimensions as well as low density.

The valve according to the present invention is defined by claim 1. The inventive valve is characterized in that the closure element is a hollow body which in its interior includes at least one movable, magnetizable activator body.

The magnetic valve of the invention is opened by causing a magnetic field to act on the closure element. The magnetizable activator bodies, which are freely movable in the closure element, will be moved by the magnetic field. The activator bodies will be attracted by the wall of the inner chamber and in the process will entrain the entire hollow body, whereby the closure element will be moved away from the valve seat.

The advantage of such a closure element resides in its low density which, for instance, is lower than 1 g/cm$^3$. Thus, the closure element is given a small mass but nonetheless a large surface. As a result of its small mass, the closure element will be considerably accelerated by the magnetic field. Due to the large surface of the closure element, the flow will produce a considerable restoring force. Thus, the valve will have short reaction times in the opening and closing processes. The low density and the large surface of the closure element are obtained by designing the closure element as a hollow body. Such a hollow body will be carried back onto the valve seat already by a merely low flow velocity which is caused by a small pressure difference between the valve input and the valve output. The activator bodies which are freely movable in the hollow body have the advantage that the hollow body is allowed to have a very small wall thickness. The wall thickness is not dictated by the magnetic requirements and thus can be selected exclusively under the aspect of stability. Within the scope of the invention, the wall of the hollow chamber can be made of a magnetizable material. In this case, the hollow body will enhance the effect of the activator bodies.

According to a preferred embodiment of the invention, the wall of the hollow body is made of a non-magnetizable material such as particularly plastic, aluminum or titanium. Preferably, the activator bodies arranged for movement within the hollow body of the closure element are small magnetizable balls which can easily perform a rolling movement and can be effectively moved by a magnetic field. Under the influence of the outer magnetic field, the balls are pulled against the wall of the hollow body, thus pressing the hollow body away from its valve seat against the side wall of the inner chamber.

With particular advantage, the hollow body of the closure element is a hollow ball.

According to a preferred embodiment of the invention, it is provided that the inner chamber of the hollow body has a spherical shape and that the diameter of the activator body is maximally 50% of the diameter of said hollow chamber. In case of a plurality of activator bodies included within the same hollow body, the diameter of an activator body is maximally 20% of the diameter of said hollow body.

Embodiments of the invention will be explained in greater detail hereunder with reference to the drawing.

Figure 2:
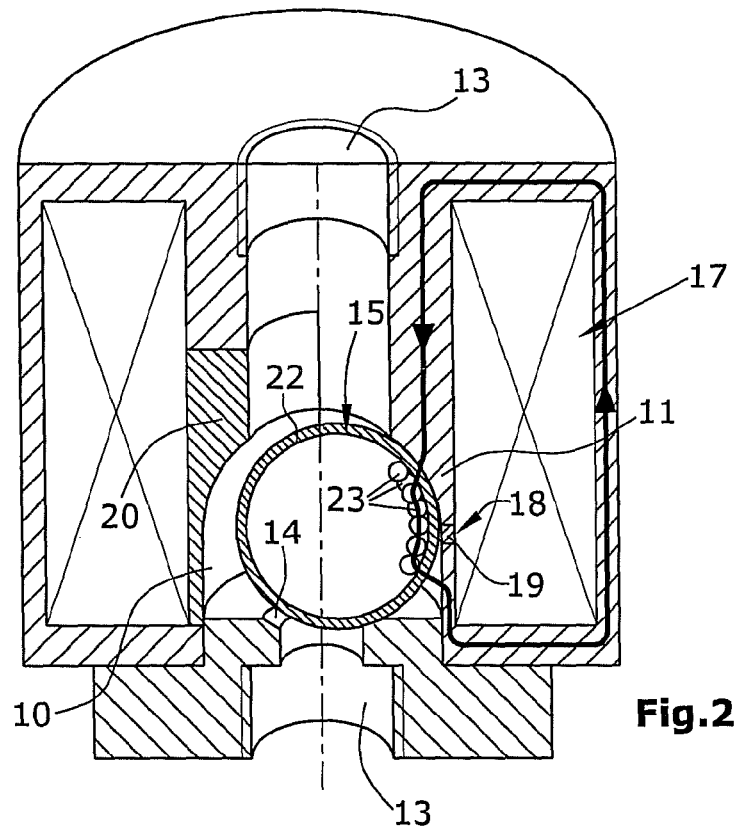
Figure 3:
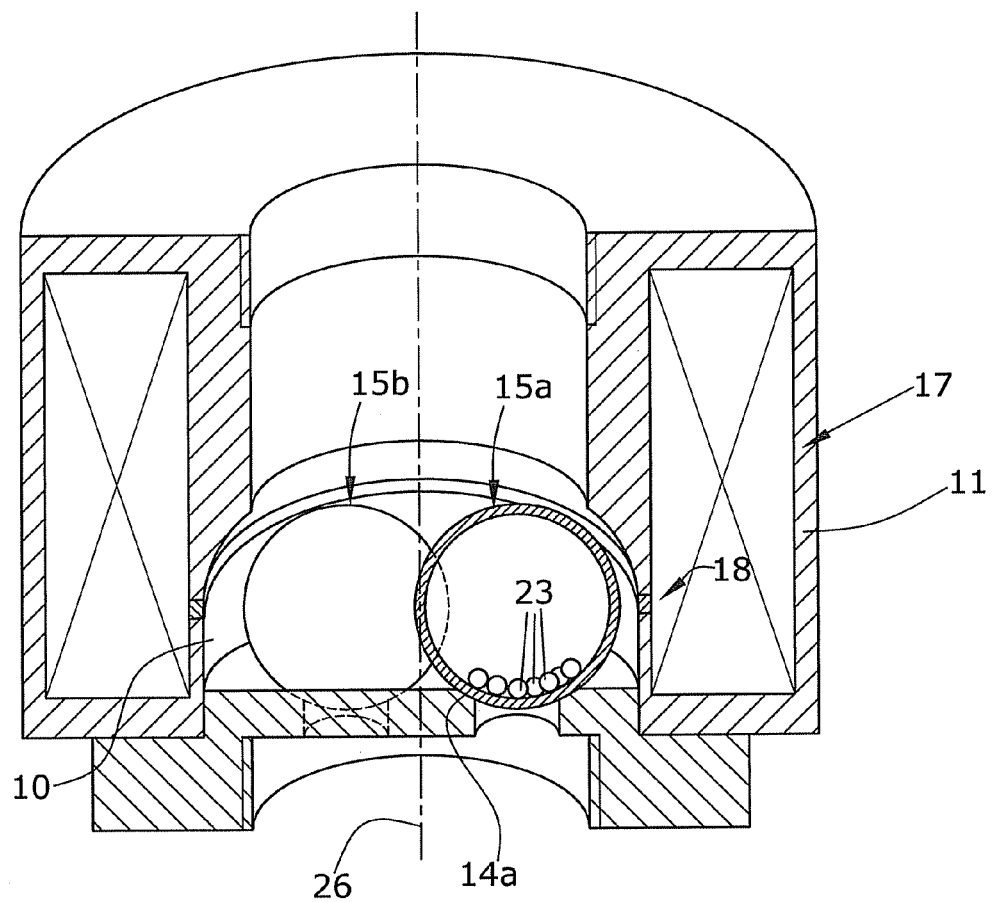

FIG. 1 is a longitudinal sectional view of a magnetic valve of the invention in the closed state of the closure element, FIG. 2 is a view of the magnetic valve according to FIG. 1 in the opened state, and FIG. 3 is a view of an embodiment comprising a plurality of closure elements.

The valve illustrated in FIGS. 1 and 2 comprises an inner chamber 10 surrounded by a wall 11 and made of a magnetizable material or including such a material. Said inner chamber 10 comprises an axial inflow opening 12 and, at the opposite end, a valve seat 14 followed by an outflow opening 13. The closure element 15, formed as a ball, is arranged inside inner chamber 10 and fits onto said valve seat 14 and is adapted to close the latter. Closure element 15 is movable parallel to the plane of valve seat 14 as well as vertically to this plane.

The annular wall 11 comprises a magnetic assembly 17 inside an annular hollow chamber, the magnetic assembly 17 being realized as a coil of electrically conductive wire. Said magnetic assembly is embedded in the magnetizable wall 11 and is enclosed by the wall.

The magnetizable material of wall 11 comprises a discontinuity site 18 in the form of a gap filled with non-magnetizable material 19. Said discontinuity site 18 is arranged at a side of inner chamber 10. On the opposite site, in the area of inner chamber 10, wall 11 is provided with an insert 20 of non-magnetizable material. Said insert 20 has the effect that the magnetic field will be weakened on the side of insert 20 and will be concentrated on the opposite side where the discontinuity site 18 is located.

According to the invention, closure element 15 consists of a hollow body 22 and at least one activator body 23 which is movable in the hollow chamber of the hollow body. In the present case, the activator bodies 23 are balls made of magnetizable material and movable independently from each other. Hollow body 22 can consist of a non-magnetizable material and thus can be produced as a light-weighted part. Its wall thickness is determined by the required rigidity and stability of shape.

FIG. 2 shows the valve in the excited state of the magnetic assembly 17, with the path of the magnetic flux 25 in wall 11 being schematically outlined. At the discontinuity site 18, the magnetic flux issues out from wall 11 and proceeds via the activator site to then enter into wall 11 again. In the process, the magnetic flux will pull the activator bodies 23 toward wall 11. The activator bodies 23 come to rest against the wall of hollow body 22 and press the hollow body against wall 11. Thereby, the closure element 15 is caused to roll laterally off the valve seat 14, thus unblocking the latter so that the gaseous or fluid medium can flow from the valve inlet to the valve outlet.

In FIG. 1, the activator bodies 23 are arranged in the lower region of hollow body 22, which occurs under the effect of gravity. When the magnetic assembly 17 is excited as shown in FIG. 2, the magnetic flux 25 will move the activator bodies 23 into the lateral region of the hollow body.

FIG. 3 is a view of an embodiment comprising a plurality of closure elements 15a, 15b arranged in a common inner chamber 10, each of the plural closure element having its own valve seat assigned to it. The valve seats, of which only valve seat 14a is visible in FIG. 3, are arranged at a distance from the longitudinal central axis 26, i.e. eccentrically to inner chamber 10. In this embodiment, the discontinuity site 18 extends in an annular configuration around inner chamber 10 because, due to the eccentric arrangement of the closure elements, a weakening of the magnetic flux on one side of the inner chamber is not required. Also here, the closure elements 15a, 15b include activator bodies 23. In the embodiment according to FIG. 3, a total of three closure elements are provided, only two of them visible in the Figure.

The invention claimed is:

1. A magnetically operable valve, comprising an inner chamber which is delimited by at least one wall of magnetizable material and includes a valve seat, said valve further comprising a magnetic assembly generating a magnetic circuit with a magnetic flux extending in the interior of said magnetizable wall, and further comprising at least one closure element arranged for movement within the inner chamber, said magnetizable wall having at least one discontinuity site for deforming the magnetic field, the magnetic field at said discontinuity site issuing from out of the wall in the direction toward the closure element, wherein the closure element is a hollow body including in its interior at least one movable magnetizable activator body movable within the interior of the hollow body, wherein the wall of the hollow body is made of a non-magnetizable material.

2. The valve according to claim 1, wherein the non-magnetizable material is plastic, aluminum or titanium.

3. The valve according to claim 2, wherein at least one activator body is a ball.

4. The valve according to claim 3, wherein the hollow body is a hollow ball.

5. The valve according to claim 4, wherein the hollow chamber of the hollow body is spherical and the diameter of the activator body is maximally 50% of the diameter of said hollow chamber.

6. The valve according to claim 3, wherein the hollow chamber of the hollow body is spherical and the diameter of the at least one activator body is maximally 50% of the diameter of said hollow chamber.

7. The valve according to claim 6, wherein besides said at least one activator body at least one further activator body is provided, wherein the activator bodies are mutually independently movable and wherein the diameter of each activator body is maximally 20% of the diameter of said hollow chamber.

8. The valve according to claim 2, wherein the hollow body is a hollow ball.

9. The valve according to claim 8, wherein the hollow chamber of the hollow body is spherical and the diameter of the at least one activator body is maximally 50% of the diameter of said hollow chamber.

10. The valve according to claim 2, wherein the inner chamber comprises a plurality of valve seats, each valve seat having a movable closure element assigned to it.

11. The valve according to claim 1, wherein at least one activator body is a ball.

12. The valve according to claim 11, wherein the hollow body is a hollow ball.

13. The valve according to claim 12, wherein the hollow chamber of the hollow body is spherical and the diameter of the activator body is maximally 50% of the diameter of said hollow chamber.

14. The valve according to claim 11, wherein the hollow chamber of the hollow body is spherical and the diameter of the at least one activator body is maximally 50% of the diameter of said hollow chamber.

15. The valve according to claim 14, wherein besides said at least one activator body at least one further activator body is provided, wherein the activator bodies are mutually independently movable and wherein the diameter of each activator body is maximally 20% of the diameter of said hollow chamber.

16. The valve according to claim 11, wherein the inner chamber comprises a plurality of valve seats, each valve seat having a movable closure element assigned to it.

17. The valve according to claim 1, wherein the hollow body is spherical.

18. The valve according to claim 17, wherein the diameter of the at least one activator body is maximally 50% of the diameter of said hollow chamber.

19. The valve according to claim 18, wherein besides said at least one activator body at least one further activator body is provided, wherein the activator bodies are mutually independently movable and wherein the diameter of each activator body is maximally 20% of the diameter of said hollow chamber.

20. The valve according to claim 1, wherein the inner chamber comprises a plurality of valve seats, each valve seat having a movable closure element assigned to it.

* * * * *